(12) United States Patent
Kanaya et al.

(10) Patent No.: US 6,514,330 B1
(45) Date of Patent: Feb. 4, 2003

(54) INK COMPOSITION CONTAINING COPPER COMPLEX COLORANT

(75) Inventors: Miharu Kanaya, Nagano-Ken (JP); Kyoichi Oka, Nagano-Ken (JP); Kazuaki Watanabe, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/544,851

(22) Filed: Apr. 6, 2000

(30) Foreign Application Priority Data

Apr. 6, 1999 (JP) .......................................... 11-098999
Apr. 14, 1999 (JP) .......................................... 11-107188

(51) Int. Cl.⁷ .............................................. C09D 11/02
(52) U.S. Cl. ............................... 106/31.49; 106/31.78; 106/31.58; 106/31.86
(58) Field of Search .......................... 106/31.49, 31.78, 106/31.58, 31.56

(56) References Cited

U.S. PATENT DOCUMENTS

| | | | | |
|---|---|---|---|---|
| 4,864,324 A | * | 9/1989 | Shirota et al. ................ | 346/1.1 |
| 5,089,050 A | * | 2/1992 | Vieira et al. ............. | 106/31.43 |
| 5,690,723 A | * | 11/1997 | Sano et al. ............... | 106/31.75 |
| 5,725,641 A | | 3/1998 | MacLeod ................... | 106/31.5 |
| 5,741,354 A | * | 4/1998 | Kawasumi et al. ...... | 106/31.58 |
| 5,785,743 A | * | 7/1998 | Adamic et al. .......... | 106/31.27 |
| 5,897,694 A | * | 4/1999 | Woolf ...................... | 106/31.27 |
| 5,948,154 A | * | 9/1999 | Hayashi et al. .......... | 106/31.48 |
| 6,039,793 A | * | 3/2000 | Gundlach et al. ........ | 106/31.28 |
| 6,083,315 A | * | 7/2000 | Nakamura et al. ......... | 106/31.6 |
| 6,132,502 A | * | 10/2000 | Yatake ..................... | 106/31.86 |
| 6,210,473 B1 | * | 4/2001 | Boils et al. .............. | 106/31.43 |
| 6,231,654 B1 | * | 5/2001 | Elwakil ................... | 106/31.47 |

FOREIGN PATENT DOCUMENTS

| | | | | |
|---|---|---|---|---|
| EP | 0223501 | 5/1987 | | |
| EP | 0359376 | 3/1990 | | |
| EP | 0899311 | 3/1999 | | |
| JP | 05(1993)-5073 | 1/1993 | ........... | C09D/11/00 |

OTHER PUBLICATIONS

JPO Abstract 05(1993)–5073, Jan 14, 1993.

* cited by examiner

*Primary Examiner*—Mark L. Bell
*Assistant Examiner*—Veronica F. Faison
(74) *Attorney, Agent, or Firm*—Ladas & Parry

(57) ABSTRACT

Disclosed is an ink composition for ink jet recording which is free from precipitation and can realize, on a high level, various properties required of ink compositions for ink jet recording. In a copper complex colorant-containing ink for ink jet recording, the free copper ion concentration of the ink composition is brought to not more than 10 ppm. Preferably, ethylenediaminetetraacetic acid or a salt thereof is used to bring the free copper ion concentration to not more than 10 ppm.

19 Claims, No Drawings

INK COMPOSITION CONTAINING COPPER COMPLEX COLORANT

BACKGROUND OF THE INVENTION

1. Field of the Invention

The present invention relates to an ink composition for ink jet recording, comprising a copper complex colorant, such as a copper complex dye or a copper phthalocyanine pigment.

2. Background Art

Ink jet recording is a printing method wherein droplets of an ink composition are ejected and deposited onto recording media, such as paper, to conduct printing. This method has a feature that images having high resolution and high quality can be printed at a high speed by means of relatively inexpensive apparatuses. Properties associated with reliability, such as freedom from the occurrence of precipitate, such as precipitate, in the ink composition, good recovery from nozzle clogging, and excellent storage stability, are required for an ink composition for ink jet recording.

In the case of ink compositions using dyes as the colorant, metal ions (such as calcium, magnesium, silicon, and iron ions) contained in the ink compositions are sometimes causative of the occurrence of precipitate or deteriorated recovery from clogging. For this reason, these metal ions should be kept in a certain amount or less. For example, how to remove calcium ions is described in Japanese Patent Laid-Open No. 5073/1993.

According to studies conducted by the present inventors, however, for ink compositions using copper complex dyes, the occurrence of precipitate in the ink compositions or poor recovery from clogging was observed even under conditions such that the metal ions were controlled in the certain amount or less.

On the other hand, in the case of ink compositions using non-water-soluble pigments as the colorant, the particle diameter of the pigments per se sometimes causes the occurrence of precipitate or deteriorated recovery from nozzle clogging. Therefore, the regulation of the particle diameter is important to pigment-based ink compositions. Even though the particle diameter of ingredients in the ink composition is regulated at the time of the preparation of the ink composition, precipitate or the like often occurs prior to use of the ink composition. According to studies conducted by the present inventors, the occurrence of precipitate was observed in ink compositions containing copper complex colorants, such as copper phthalocyanine pigments or dyes having a copper complex structure.

SUMMARY OF THE INVENTION

The present inventors have now found that the regulation of the concentration of free copper ions in ink compositions for ink jet recording, containing a copper complex colorant, such as a copper complex dye or a copper phthalocyanine pigment, can effectively prevent the occurrence of precipitate and, at the same time, can realize, on a high level, various properties required of ink compositions for ink jet recording. The present invention has been made based on such finding.

Accordingly, it is an object of the present invention to provide a precipitation-free ink composition for ink jet recording.

It is another object of the present invention to provide an ink composition for ink jet recording which can realize, on a high level, various properties required of ink compositions for ink jet recording.

According to one aspect of the present invention, there is provided an ink composition for ink jet recording, comprising a copper complex colorant, said ink composition having a free copper ion concentration of not more than 10 ppm.

DESCRIPTION OF PREFERRED EMBODIMENTS

The ink composition according to the present invention contains a copper complex colorant as a colorant. According to a preferred embodiment of the present invention, specific examples of copper complex colorants usable herein include copper complex dyes and copper phthalocyanine pigments.

Specific examples of copper complex dyes usable herein include: C.I. Direct Violet 47, 48, 90, and 91; C.I. Direct Blue 86, 87, 90, 98, 194, 195, 196, 199, 226, and 248; C.I. Direct Brown 95, 100, 112, 194, and 211; C.I. Direct Black 71, 105, 106, 107, 108, and 146; C.I. Acid Red 161; C.I. Acid orange 87, 88, and 122; C.I. Acid Red 194, 209, 211, 215, and 216; C.I. Acid Blue 151, 154, 167, 168, 170, 171, 184, 187, 199, 229, and 234; C.I. Acid Green 56, 57, 60, and 65; C.I. Acid Brown 231, 232, 294, and 296; C.I. Acid Black 58, 60, 62, 64, 107, 108, 112, 115, 118, 119, 121, 122, 131, 132, 139, 140, 155, and 156; C.I. Mordant Blue 58; C.I. Solvent Yellow 61 and 80; C.I. Solvent Orange 37, 40, and 44; C.I. Solvent Red 83, 84, and 121; C.I. Solvent Violet 21; C.I. Solvent Blue 55; C.I. Solvent Black 22 and 23; C.I. Reactive Red 6, 7, 27, 32, and 130; C.I. Reactive Violet 1, 2, 3, 4, and 5; C.I. Reactive Blue 3, 7, 9, 10, 13, 14, 15, 18, 20, 21, 25, 26, 38, 40, 41, 43, 52, 63, 71, 72, 77, 79, 80, 105, 113, 15 118, 120, 121, 122, 131, 140, 147, and 148; C.I. Reactive Brown 14, 18, and 19; C.I. Reactive Black 1, 8, 9, 13, 31, and 35; C.I. Reactive Green 5, 12, 14, and 15.

According to a preferred embodiment of the present invention, the copper phthalocyanine pigment is represented by the following formula:

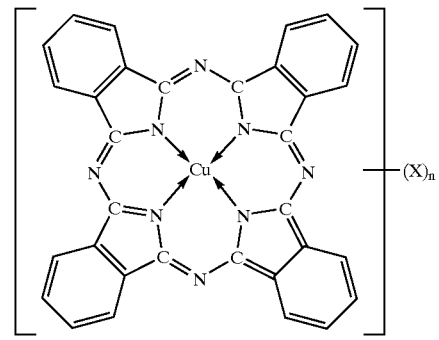

wherein X represents a chlorine or bromine atom or a hydrogen atom; and n is an integer of 14 to 16.

The copper phthalocyanine pigment is more preferably selected from the group consisting of C.I. Pigment Green 7 and 36 and C.I. Pigment Blue 15: x wherein x is an integer of 1 to 6 with C.I. Pigment Blue 15: 1, C.I. Pigment Blue 15: 3, and C.I. Pigment Blue 15: 6 being preferred pigments.

The content of the copper complex colorant in the ink composition may be properly determined. The copper complex colorant, however, is preferably about 0.1 to 20% by weight, more preferably about 1 to 10% by weight. When the copper complex colorant is a copper complex dye, the content of the copper complex dye is preferably about 0.1 to 20% by weight, more preferably about 1 to 10% by weight.

When the copper complex colorant is a copper phthalocyanine pigment, the content of the copper phthalocyanine pigment is preferably about 1 to 10% by weight, more preferably about 2 to 5% by weight.

According to the ink composition of the present invention, the free copper ion concentration is not more than 10 ppm, more preferably not more than 5 ppm. Methods usable for regulating the free copper ion concentration include a method wherein the degree of the purification of the colorant is enhanced, and a method wherein the free copper ion is sequestered by a sequestering agent. Examples of preferred sequestering agents include ethylenediaminetetraacetic acid (EDTA), nitrilotriacetic acid, hydroxyethylethylenediamine-triacetic acid, uramil diacetic acid, and metal salts (for example, sodium salt) of the above compounds.

When the free copper ion concentration falls within the above concentration range, precipitation after the production of the ink can be prevented. In addition, good storage stability, ejection stability, and clogging preventive effect can be attained.

The free copper ion concentration may be measured, for example, by ion chromatography, inductively coupled plasma mass spectroscopy (ICP-MS), or capillary electrophoresis.

When the copper complex colorant is a copper phthalocyanine pigment, the above free copper ion concentration is preferably realized by the addition of EDTA or a metal salt thereof. The amount of EDTA added may be properly determined so that precipitation can be suppressed. The content of EDTA is preferably not less than 20% by weight based on the copper phthalocyanine pigment. Since, however, the addition of EDTA in an excessive amount has a fear of the stability of the ink composition being deteriorated, the upper limit of the amount of EDTA added is preferably determined so that EDTA does not deteriorate the stability of the ink composition. Although the reason why the addition of EDTA can effectively prevent precipitation has not been fully elucidated yet, the reason is believed to reside in that the component derived from the copper phthalocyanine pigment is sequestered by EDTA. The present inventors have found that treating the copper phthalocyanine pigment with EDTA before the addition of the copper phthalocyanine pigment to the ink composition can provide an ink composition which is much less likely to cause precipitation. Thus, according to another aspect of the present invention, there is provided a process for producing an ink composition comprising a copper phthalocyanine pigment, said process comprising the steps of:

bringing a copper phthalocyanine pigment into contact with EDTA or a metal salt of EDTA; and then producing an ink composition using the treated copper phthalocyanine pigment.

According to still another aspect of the present invention, there is provided an ink composition produced by this process.

According to a preferred embodiment of the present invention, in an ink composition comprising a copper complex dye and a benzotriazole compound as a rust preventive or a thiazole compound as antimold, the regulation of the free copper ion concentration can effectively prevent the occurrence of precipitate. According to experiments conducted by the present inventors, a combination of the benzotriazole compound as the rust preventive or the thiazole compound as the antimold with the copper complex dye has caused significant precipitation. The regulation of the free copper ion concentration, even when the ink composition contains the benzotriazole compound as the rust preventive or the thiazole compound as the antimold, can effectively prevent the occurrence of precipitate. The rust preventive and the antimold may also be, of course, added to ink compositions using copper phthalocyanine pigments as the copper complex colorant, and specific examples of preferred rust preventives and antimold will be described later.

According to a preferred embodiment of the present invention, the addition of EDTA to an ink composition comprising a copper phthalocyanine pigment, a penetrable solvent and/or a surfactant can effectively prevent precipitation. So far as the present inventors know, when the ink composition contains a copper phthalocyanine pigment and a penetrable solvent and/or a surfactant, the occurrence of precipitate is significant. The addition of EDTA can effectively prevent the precipitation even when the ink composition contains a copper phthalocyanine pigment and a penetrable solvent and/or a surfactant. The penetrable solvent and the surfactant may also be, of course, added to ink compositions using copper complex dyes as the copper complex colorant, and specific examples of preferred penetrable solvents and surfactants will be described later.

The ink composition according to the present invention preferably contains a rust preventive from the viewpoint of preventing corrosion of metallic portions which come into contact with the ink composition. Examples of preferred rust preventives include benzotriazoles, acid sulfites, sodium thiosulfate, ammonium thioglycolate, diisopropylammonium nitrite, pentaerythritol tetranitrate, and dicyclohexylammonium nitrite. Among them, benzotriazoles are particularly preferred.

The ink composition according to the present invention preferably contains antimold. Mold grown by contamination with bacteria is often causative of deteriorated storage stability of the ink composition or nozzle clogging. The addition of the antimold can effectively prevent these unfavorable phenomena. Examples of preferred types of antimold include: thiazole and isothiazole compound, such as benzisothiazolone, isothiazolone, 1,2-benzisothiazolin-3-one, 5-chloro-2-methyl-4-isothiazolin-3-one, 2-(thiocyanomethylthio)-benzothiazole, 2-mercaptobenzothiazole, and 3-allyloxy-1,2-benzisothiazole-1,1-oxide; sodium 2,2-dimethyl-6-acetoxydioxane-1,3-dihydroacetate, butyl p-hydroxybenzoate, potassium sorbate, sodium 2-pyridinethiol-1-oxide anionic surfactant, sodium benzoate, sodium propionate, and sodium dehydroacetate. Among them, thiazole and isothiazole compounds are particularly preferred. Proxel Series (Proxel BD, N, BD 20, GX, L, LV, XL-2, and TN), which are thiazole compounds available from ZENECA, may also be preferably utilized.

The ink composition according to the present invention preferably contains a penetrable solvent. Examples of penetrable solvents usable herein include alkyl ethers of polyhydric alcohols. Specific examples of alkyl ethers of polyhydric alcohols include ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. They may be added alone or as a mixture of two or more.

The ink composition according to the present invention preferably contains a surfactant. Examples of surfactants usable herein include compounds represented by formula (I):

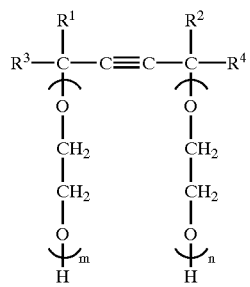

(I)

wherein $0 \leq m+n \leq 50$; and $R^1$, $R^2$, $R^3$, and $R^4$ each independently represent an alkyl group (preferably a $C_{1-6}$ alkyl group).

Commercially available products may be used as the compound represented by the formula (I). Specific examples thereof include OLFINE Y, OLFINE E 1010, Surfynol 82, Surfynol 440, Surfynol 465, and Surfynol 485 (all the above products being manufactured by Air Products and Chemicals Inc.). They may be added alone or in combination of two or more.

Examples of other surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides).

According to a preferred embodiment of the present invention, the copper phthalocyanine pigment is added, to the ink composition, as a pigment dispersion obtained by dispersing the pigment in an aqueous medium with the aid of a dispersant or a surfactant. Preferred dispersants include dispersants commonly used in the preparation of pigment dispersions, for example, polymeric dispersants. It would be apparent to a person having ordinary skill in the art that the dispersant and the surfactant contained in the pigment dispersion function also as the dispersant and the surfactant in the ink composition. Examples of preferred polymeric dispersants include naturally occurring polymeric compounds, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxycellulose. Examples of preferred polymeric dispersants include synthetic polymeric dispersants, and examples thereof include polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/acrylic ester copolymer; styrene/acrylic resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred.

A preferred solvent usable in the ink composition according to the present invention comprises water and a water-soluble organic solvent. According to a preferred embodiment of the present invention, the ink composition of the present invention further comprises a wetting agent comprising a high-boiling organic solvent. Preferred examples of high-boiling organic solvents usable herein include polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; urea; 2-pyrrolidone; N-methyl-2-pyrrolidone; and 1,3-dimethyl-2-imidazolidinone. The amount of the wetting agent added is preferably 2 to 30% by weight, more preferably 5 to 20% by weight, based on the ink composition.

The ink composition of the present invention may contain a saccharide. Examples of preferred saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose. Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol. The content of the saccharide is preferably about 1 to 10% by weight based on the ink composition.

If necessary, pH adjustors, rust preventives, preservatives, antimolds, phosphorus-based antioxidants and the like may be added to the ink composition of the present invention.

The ink composition may be prepared by dissolving or dispersing and mixing the above ingredients together by means of a suitable method. When the colorant is a copper phthalocyanine pigment, preferably, the pigment, the polymeric dispersant, and water are first mixed together by means of a suitable dispergator (for example, a ball mill, a sand mill, an attritor, a roll mill, an agitator mill, a Henschel mixer, a colloid mill, an ultrasonic homogenizer, a jet mill, or an angmill) to prepare a homogeneous pigment dispersion. Subsequently, water, EDTA, a penetrable solvent, a surfactant, a water-soluble organic solvent, a saccharide, a pH adjustor, a preservative, an antimold and the like are added to and satisfactorily dissolved in the pigment dispersion to prepare an ink solution. After thorough stirring, the ink solution is filtered to remove coarse particles and foreign matter causative of nozzle clogging to obtain a contemplated ink composition.

EXAMPLES

The present invention will be described in more detail with reference to the following examples, though it is not limited to these examples only.

Example A

Examples A1 to A13

Preparation of Ink Compositions

The following composition (I) was combined with dyes 1 to 5 to prepare ink compositions. Copper ions were added to some of the ink compositions. All the numerical values associated with the compositions are in % by weight. The free copper ion concentration of the ink compositions was measured by ion chromatography. In the ion chromatography, quantitative determination was carried out using Dionix 2000i (manufactured by Dionix) by colorimetry.

|  | Compsition (I) |
| --- | --- |
| Dye | 4 |
| Triethylene glycol monobutyl ether | 10 |
| Triethanolamine | 0.5 |
| Glycerin | 10 |
| Benzotriazole | 0.01 |
| Diethylene glycol | 10 |
| Olfine E 1010 | 1 |
| Pure water | Balance |

Dyes

1: ProJet Fast Cyan 2 (manufactured by ZENECA)

2: C.I. Reactive Black 31

3: C.I. Direct Blue 199

4: C.I. Direct Blue 86

5: C.I. Direct Blue 87

Evaluation Test on Properties of Ink Compositions

Evaluation A1: Storage stability of ink compositions

Each ink composition was hermetically sealed in a glass sample bottle. The bottles were then allowed to stand at −30° C. and 70° C. for seven days. After the standing, each of the ink compositions allowed to the room temperature was dropped on a 10-$\mu$m filter, followed by inspection for precipitate. For properties of the ink compositions, viscosity and pH were measured. Further, a change in color tone was inspected. The results were evaluated according to the following criteria.

A: Any precipitate was not produced under both the environments, and neither properties nor color tone of the ink composition changed.

B: Under any one of or both environments, the properties and color tone of the ink composition underwent a change on such a level that does not pose any practical problem.

C: Under any one of or both environments, the properties and color tone of the ink composition underwent a change on such a level that poses a practical problem.

Evaluation A2: Ejection Stability

Each ink composition was continuously ejected by means of an ink jet printer MJ-930C (manufactured by Seiko Epson Corp.) under environments of room temperature, 5° C., and 40° C. for 24 hr. At that time, the state of ejection of the ink composition was inspected. The results were evaluated according to the following criteria.

A: The ink composition was stably ejected throughout the 24-hr period under all the environment conditions.

B: Under some of the environment conditions, a problem of dropouts or an ink droplet trajectory directionality problem occurred.

Evaluation A3: Recovery from Nozzle Clogging

Each ink composition was printed by means of an ink jet printer as used in the evaluation A2. After the ejection of the ink composition through nozzles was confirmed, the printer was stopped, and allowed to stand without capping the recording head under an environment of 40° C. for one month. After the standing for one month, the power supply of the printer was turned on to perform cleaning operations until all the nozzles could eject the ink composition. The number of cleaning operations thus counted was evaluated according to the following criteria.

A: Once

B: Twice to four times

C: Five to eight times

D: Not recovered even after eight cleaning operations

The results of the evaluation were as summarized in the following table.

| Example | Dye | Copper ion concentration | Evaluation A1 | Evaluation A2 | Evaluation A3 |
| --- | --- | --- | --- | --- | --- |
| A1 | 1 | 0.92 | A | A | A |
| A2 | 2 | 1.02 | A | A | A |
| A3 | 3 | 1.04 | A | A | B |
| A4 | 3 | 5.23 | A | A | B |
| A5 | 4 | 7.53 | A | A | B |
| A6 | 5 | 8.21 | B | A | B |
| A7 | 3 | 8.62 | B | A | B |
| A8 | 3 | 10.00 | B | A | B |
| A9 | 3 | 10.42 | B | A | C |
| A10 | 3 | 11.23 | B | A | C |
| A11 | 4 | 22.24 | C | A | D |
| A12 | 2 | 30.32 | C | A | D |
| A13 | 5 | 35.36 | C | B | D |

Example A14 to A26

The ink compositions of Example A 14 to A26 were prepared in the same manner as those of Example A1 to A13, except that 0.3 wt % of Proxel XL-2, as an antimold containing thiazole compound was added, respectively. The ink compositions were subjected to Evaluation test A1 to A3. The results of the evaluation were as summarized in the following table.

| Example | Evaluation A1 | Evaluation A2 | Evaluation A3 |
| --- | --- | --- | --- |
| A14 | A | A | A |
| A15 | A | A | A |
| A16 | A | A | B |
| A17 | A | A | B |
| A18 | A | A | B |
| A19 | B | A | B |
| A20 | B | A | B |
| A21 | B | A | B |
| A22 | C | A | C |
| A23 | C | A | C |
| A24 | C | B | D |
| A25 | C | B | D |
| A26 | C | B | D |

Example A27 to A39

The ink compositions of Example A27 to A39 were prepared in the same manner as those of Example A14 to A26, except that 0.02 wt % of disodium ethylenediaminetetraacetate, as a sequestering agent was added, respectively. While copper ion concentrations of these ink compositions were measured in the same manner of Examples A1 to A13, the ink compositions were subjected to Evaluation test A1 to A3. The results of the evaluation were as summarized in the following table.

| Example | Copper ion concentration | Evaluation A1 | Evaluation A2 | Evaluation A3 |
|---------|--------------------------|---------------|---------------|---------------|
| A27 | 0.55 | A | A | A |
| A28 | 0.60 | A | A | A |
| A29 | 0.57 | A | A | A |
| A30 | 5.00 | A | A | B |
| A31 | 5.50 | A | A | B |
| A32 | 8.00 | B | A | B |
| A33 | 8.40 | B | A | B |
| A34 | 9.20 | B | A | B |
| A35 | 10.30 | B | A | C |
| A36 | 10.90 | B | A | C |
| A37 | 15.70 | C | A | C |
| A38 | 25.30 | C | A | D |
| A39 | 30.50 | C | B | D |

Example B

Preparation of Ink Compositions

Ink compositions were prepared according to the following formulations.

Each of the ink compositions thus obtained was treated with sulfuric acid to precipitate the pigment, and the supernatant liquid was quantitatively analyzed in the same manner as in Example A to determine the free copper ion concentration of the ink composition.

Example B1

| | |
|---|---|
| C.I. Pigment Blue 15:3 | 2.5 wt % |
| Disodium ethylenediaminetetraacetate dihydrate (hereinafter referred to as "EDTA · Na$_2$ · 2H$_2$O") | 0.05 wt % |
| Styrene/acrylic acid copolymer (dispersant) (solid basis) | 5 wt % |
| Glycerin | 20 wt % |
| Maltitol | 7 wt % |
| 2-Pyrrolidone | 2 wt % |
| Triethanolamine | 0.9 wt % |
| Pure water | Balance |

The free copper ion concentration of the ink composition was 3.6 ppm.

Example B2

An ink composition was prepared in the same manner as in Example B1, except that the amount of EDTA.Na$_2$.2H$_2$O was changed to 0.1% by weight. The free copper ion concentration of this ink composition was 2.8 ppm.

Example B3

An ink composition was prepared in the same manner as in Example B1, except that the amount of EDTA.Na$_2$.2H$_2$O was changed to 0.2% by weight. The free copper ion concentration of this ink composition was 2.1 ppm.

Example B4

An ink composition was prepared in the same manner as in Example B1, except that 1% by weight of Olfine E 1010 and 5% by weight of triethylene glycol monobutyl ether were added. The free copper ion concentration of this ink composition was 3.9 ppm.

Example B5

An ink composition was prepared in the same manner as in Example B1, except that the pigment concentration was changed to 3.5% by weight and the amount of EDTA.Na$_2$.2H$_2$O was changed to 0.07% by weight. The free copper ion concentration of this ink composition was 4.8 ppm.

Example B6

An ink composition was prepared in the same manner as in Example B1, except that the pigment was changed to 3.5% by weight of C.I. Pigment Green 7 and the amount of EDTA.Na$_2$.2H$_2$O was changed to 0.07% by weight. The free copper ion concentration of this ink composition was 4.5 ppm.

Example B7

An ink composition was prepared in the same manner as in Example B1, except that the pigment was changed to 3.5% by weight of C.I. Pigment Green 36 and the amount of EDTA.Na$_2$.2H$_2$O was changed to 0.07% by weight. The free copper ion concentration of this ink composition was 4.0 ppm.

Example B8 (Comparative Example)

An ink composition was prepared in the same manner as in Example B1, except that EDTA.Na$_2$.2H$_2$O was not added. The free copper ion concentration of this ink composition was 18.4 ppm.

Example B9 (Comparative Example)

An ink composition was prepared in the same manner as in Example B6, except that EDTA.Na$_2$.2H$_2$O was not added. The free copper ion concentration of this ink composition was 20.9 ppm.

Evaluation Test on Properties of Ink Compositions

Evaluation B1: Storage Stability Test 1

The ink composition was loaded into an ink pack for an ink jet printer MJ-8000C (manufactured by Seiko Epson Corp.) which was then placed in a thermostatic chamber at 60° C. and, in this state, was allowed to stand for one week. After the standing, the ink composition was taken out of the ink pack, and 500 cc of the ink composition was filtered through an 8-$\mu$m membrane filter. The filtrability was evaluated according to the following criteria.

A: The filtration rate at the end of the filtration was up to 50% lower than the initial filtration rate.

B: The filtration rate at the end of the filtration was at least 50% lower than the initial filtration rate.

C: In the course of the filtration, the filter was clogged, making it impossible to complete the filtration of 500 cc of the ink composition.

Evaluation B2: Storage Stability Test 2

The ink composition was placed in a sample bottle, and then allowed to stand in a thermostatic chamber at 70° C. for one week. The difference in viscosity of the ink composition between before the standing and after the standing was evaluated according to the following criteria.

A: A viscosity change of less than 0.1 mPa·s

B: A viscosity change of 0.1 to 0.2 mPa·s

C: A viscosity change of more than 0.2 mPa·s

The results of evaluation were as shown in the following table.

| Example | Copper ion concentration | Evaluation B1 | Evaluation B2 |
|---|---|---|---|
| B1 | 3.6 | A | B |
| B2 | 2.8 | A | A |
| B3 | 2.1 | A | A |
| B4 | 3.9 | A | B |
| B5 | 4.8 | A | A |
| B6 | 4.5 | A | B |
| B7 | 4.0 | A | A |
| B8 | 18.4 | C | C |
| B9 | 20.9 | C | C |

What is claimed is:

1. An ink composition for ink jet recording, comprising a copper complex colorant, and a benzotriazole compound as a rust preventive or a thiazole compound as antimold or both, said benzotriazole compound, thiazole compound or both being present in the ink composition in an amount or in respective amounts that would, in combination with free copper ions in the ink composition at a concentration of more than 10 ppm, render the ink composition susceptible to formation of a precipitate, the ink composition being produced with regulation of the concentration of the free copper ions in the ink composition so as effectively to preclude formation of the precipitate, said ink composition having a free copper ion concentration of not more than 10 ppm.

2. The ink composition according to claim 1, wherein the copper complex colorant is a copper complex dye.

3. The ink composition according to claim 1, wherein the copper complex dye is a copper phthalocyanine dye.

4. The ink composition according to claim 1, wherein the copper complex colorant is a copper phthalocyanine pigment.

5. The ink composition according to claim 1, wherein the free copper ion concentration of the ink composition has been brought to not more than 10 ppm by the presence of a sequestering agent in the ink composition.

6. The ink composition according to claim 5, wherein the sequestering agent is ethylenediaminetetraacetic acid (EDTA) or a metal salt of EDTA.

7. The ink composition according to claim 4, wherein the copper phthalocyanine colorant is a copper phthalocyanine pigment and the content of EDTA is not less than 20% by weight based on the copper phthalocyanine pigment.

8. The ink composition according to claim 4, wherein the copper phthalocyanine pigment is represented by the following formula:

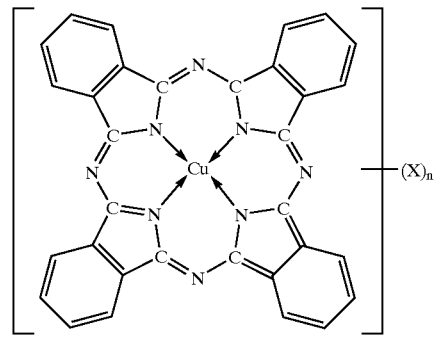

wherein X represents a chlorine or bromine atom or a hydrogen atom; and n is an integer of 14 to 16.

9. The ink composition according to claim 4, wherein the copper phthalocyanine pigment is C.I. Pigment Green 7 or 36 or C.I. Pigment Blue 15: x wherein x is an integer of 1 to 6.

10. The ink composition according to claim 1, which further contains a penetrable solvent and/or a surfactant.

11. The ink composition according to claim 10, wherein the penetrable solvent is an alkyl ether of a polyhydric alcohol.

12. The ink composition according to claim 11, wherein the alkyl ether of a polyhydric alcohol is selected from the group consisting of ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether.

13. An ink jet recording method comprising the steps of: ejecting droplets of an ink composition; and depositing the droplets onto a recording medium to perform printing, the ink composition being one according to claim 1.

14. A record produced by the recording method according to claim 9.

15. A process for producing an ink composition comprising a copper phthalocyanine pigment, said process comprising the steps of:
   bringing a copper phthalocyanine pigment into contact with EDTA or a metal salt of EDTA; and
   then producing an ink composition using the treated copper phthalocyanine pigment.

16. An ink composition produced by the process according to claim 15.

17. The ink composition according to claim 1, wherein the benzotriazole compound is present in the ink composition in an amount effective to prevent corrosion of metallic portions of an ink jet printer which come into contact with the ink composition.

18. The ink composition according to claim 1, wherein the thiazole compound is present in the ink composition in an amount effective to prevent bacteria from deteriorating storage stability of the ink composition.

19. The ink composition according to claim 1, wherein both the benzotriazole compound and the thiazole compound are present in the ink composition and the free copper ion concentration is between 0.55 and 9.20 ppm.

* * * * *